(12) United States Patent
Magnani et al.

(10) Patent No.: US 10,641,870 B1
(45) Date of Patent: May 5, 2020

(54) LIDAR SYSTEM THAT IS RESISTANT TO NOISE CAUSED BY NEARBY LIDAR SYSTEMS

(71) Applicant: BAE Systems Imaging Solutions Inc., San Jose, CA (US)

(72) Inventors: Alberto M. Magnani, Danville, CA (US); Calvin B. Ward, Castro Valley, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 0 days.

(21) Appl. No.: 16/212,728

(22) Filed: Dec. 7, 2018

Related U.S. Application Data

(60) Provisional application No. 62/767,451, filed on Nov. 14, 2018.

(51) Int. Cl.
*G01S 7/484* (2006.01)
*G01S 7/487* (2006.01)
*G01S 17/10* (2020.01)
*G01S 17/931* (2020.01)

(52) U.S. Cl.
CPC ............ *G01S 7/484* (2013.01); *G01S 7/4876* (2013.01); *G01S 17/10* (2013.01); *G01S 17/931* (2020.01)

(58) Field of Classification Search
CPC ...... G01S 7/486; G01S 7/4863; G01S 7/4865; G01S 7/4868; G01S 17/895; H04N 5/335
See application file for complete search history.

(56) References Cited

U.S. PATENT DOCUMENTS

| 2012/0262698 | A1* | 10/2012 | Day ..................... G01O 15/002 356/4.01 |
| 2013/0300838 | A1* | 11/2013 | Borowski ............... G01S 7/486 348/46 |
| 2017/0343653 | A1* | 11/2017 | Weinberg ............... G01S 7/4865 |
| 2019/0056498 | A1* | 2/2019 | Sonn ..................... G01S 17/107 |

* cited by examiner

*Primary Examiner* — Luke D Ratcliffe
(74) *Attorney, Agent, or Firm* — Calvin B. Ward (57) ABSTRACT

A LIDAR system and a method for operating a LIDAR system are disclosed. The LIDAR system broadly includes a transmitter that that emits a light pulse in response to a launch signal, a receiver that detects light pulses and determines a time of arrival for each detected light pulse; and a controller that generates an ordered sequence of frames. The controller generates a launch signal at the start of each frame and records information specifying a time of arrival relative to the start time for all light pulses received by the receiver until a stop time. After the stop time, the controller waits for the interframe delay time before generating another launch signal. The interframe delay time is different for each frame in the sequence of frames. The controller determines a distance between the transmitter and an object from the recorded information.

17 Claims, 5 Drawing Sheets

LIDAR SYSTEM THAT IS RESISTANT TO NOISE CAUSED BY NEARBY LIDAR SYSTEMS

RELATED APPLICATIONS

This application is claims priority from U.S. Provisional Application 62/767,451 filed Nov. 14, 2018, said patent applications being incorporated by reference herein.

BACKGROUND

LIDAR (Light Detection And Ranging) systems have emerged as key components to Autonomous Driving systems. The systems are analogous to RADAR systems where visible or infrared light is used rather than radio waves. The device seeking the range finding information sends out a pulse (or stream of pulses) of light and measures the time for the pulse to hit an object and return. The distance to the object is then computed from the time-of-flight. Many of these systems have been tested in isolation and can be shown to work well.

In practice, these systems will not be operating in isolation. One common specification in the automotive application is to detect the distance to objects up to 200 yards away. If all of the vehicles in that range are using LIDAR, there can be thousands of light sources sending out light pulses and looking for returns. Hence, the receiver on any LIDAR system can receive a large number of light pulses that did not originate with that receiver. The receiver must then determine which pulses are returns from that receiver's transmitter and which are "noise". Making this distinction presents a number of challenges.

SUMMARY

A LIDAR system according to the present disclosure broadly include a LIDAR system and a method for operating a LIDAR system. The LIDAR system broadly includes a transmitter that emits a light pulse in response to a launch signal, a receiver that detects light pulses and determines a time of arrival for each detected light pulse; and a controller that generates an ordered sequence of frames. Each frame is characterized by a start time, a stop time, and an interframe delay time. The controller generates the launch signal at the start time of each of the frames and records information specifying a time of arrival relative to the start time for all light pulses received by the receiver until the stop time. After the stop time, the controller waits for the interframe delay time before generating another launch signal. The interframe delay time is different for each frame in the sequence of frames. The controller determines a distance between the transmitter and an object that reflects the light pulses back to the receiver from the recorded times of arrival.

In one aspect, the LIDAR system further includes a spectrum memory having one memory location corresponding to each determined time of arrival within a predetermined range of times of arrival, the controller incrementing a value stored at one of the locations in the spectrum memory that is determined by one of the determined times of arrival.

In another aspect, the transmitter emits the light pulses in an emission direction and the receiver includes a spatial filter that eliminates light pulses outside of a predetermined range of angles relative to the emission direction.

In another aspect, the stop time for each frame is displaced from the start time for that frame by a fixed frame length.

In another aspect, the interframe delays have a duration between 0 and the fixed frame length.

In another aspect, the receiver quantizes the times of arrival to integer values, each integer value corresponding to one of the memory locations in the spectrum memory.

In another aspect, the interframe delays are generated by a pseudo-random number generator characterized by an initial seed that determines the sequence of values generated by the pseudo random number generator. In another aspect, the initial seed is different for each LIDAR system.

The method of the present disclosure broadly includes causing the LIDAR system to generate a sequence of frames, each frame including a frame start, a frame stop, and an interframe delay that is different for each frame in the sequence. For each of the frames, the method generates a light pulse at the frame start, and detects light pulses arriving at the LIDAR system between the frame start and the frame stop. Each of the detected light pulses is characterized by an arrival time at the LIDAR system relative to the frame start. The method causes the LIDAR system to store information specifying the arrival times. The method causes the LIDAR system to wait for the interframe delay after the frame stop before proceeding to a next frame. The method causes the LIDAR system to determine a distance between the LIDAR system and an object that reflects the light pulses back to the LIDAR system from the recorded information.

In one aspect of the method, only light pulses arriving from a predetermined range of directions are detected.

In another aspect of the method, generating a light pulse includes directing that light pulse in a first direction and the predetermined range of directions depends on the first direction.

In another aspect of the method, determining the distance includes computing a frequency distribution of the arrival times as a function of the arrival time.

In another aspect of the method, the stop time for each frame is displaced from the start time for that frame by a fixed frame length that is the same for all frames.

In another aspect of the method, the interframe delay periods have a length that is randomly distributed.

In another aspect of the method, the interframe delay periods depend on the LIDAR system, different LIDAR systems having different sequences of interframe delays.

In another aspect of the method, the frames are characterized by a frame length equal to the stop time minus the start time, and wherein the randomly distributed delay periods are characterized by a maximum delay that is greater than or equal to the frame length.

DETAILED DESCRIPTION

Figure 1:
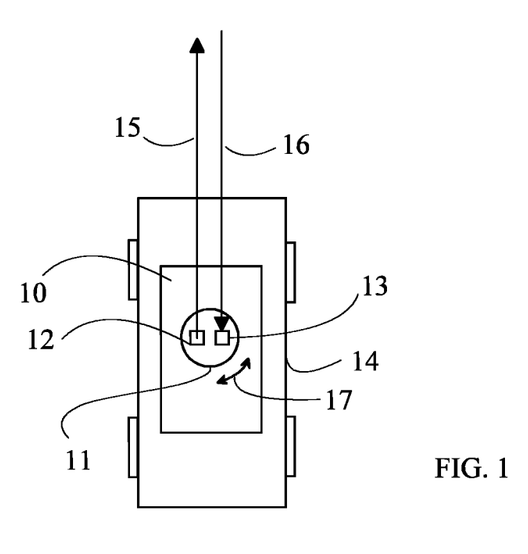
FIG. 1 illustrates a LIDAR system on an automobile according to one embodiment.

Refer now to FIG. 1, which illustrates a LIDAR system on an automobile. LIDAR system 10 is attached to automobile 14. A turret 11 that includes a transmitter 12, and a receiver 13 that rotates with respect to automobile 14 is shown at 17. Transmitter 12 is typically a laser that generates very short pulses of light at a predetermined wavelength along a path 15. Receiver 13 is typically a photodiode that detects light pulses 16 returning along path 15. In one exemplary embodiment, the transmitter is an array of lasers, and the receiver is an array of receivers. In such an exemplary embodiment, turret 11 does not need to rotate.

LIDAR system 10 typically measures the distance from automobile 14 to an object that reflects light pulses 16 by measuring the time between the transmission of a light pulse and the receipt of a light pulse by receiver 13. By rotating turret 11 and repeating the distance measurements, the locations of objects with respect to automobile 14 are deduced. The speed of the detected objects relative to automobile 14 can also be deduced by measuring the change in location of the objects relative to automobile 14 as a function of time. Turret 11 depicts a two dimensional rotation 17; however, embodiments in which turret 11 rotates in three dimensions can also be constructed.

The above described system assumes that there are no significant "noise" pulses received by receiver 13 during the time period in which a return pulse is expected. Noise pulses can result from multiple reflections or other LIDAR systems illuminating the object being ranged. The reflecting surface of the object being ranged can give rise to scattering of the incoming light pulses from another LIDAR system.

Figure 2:
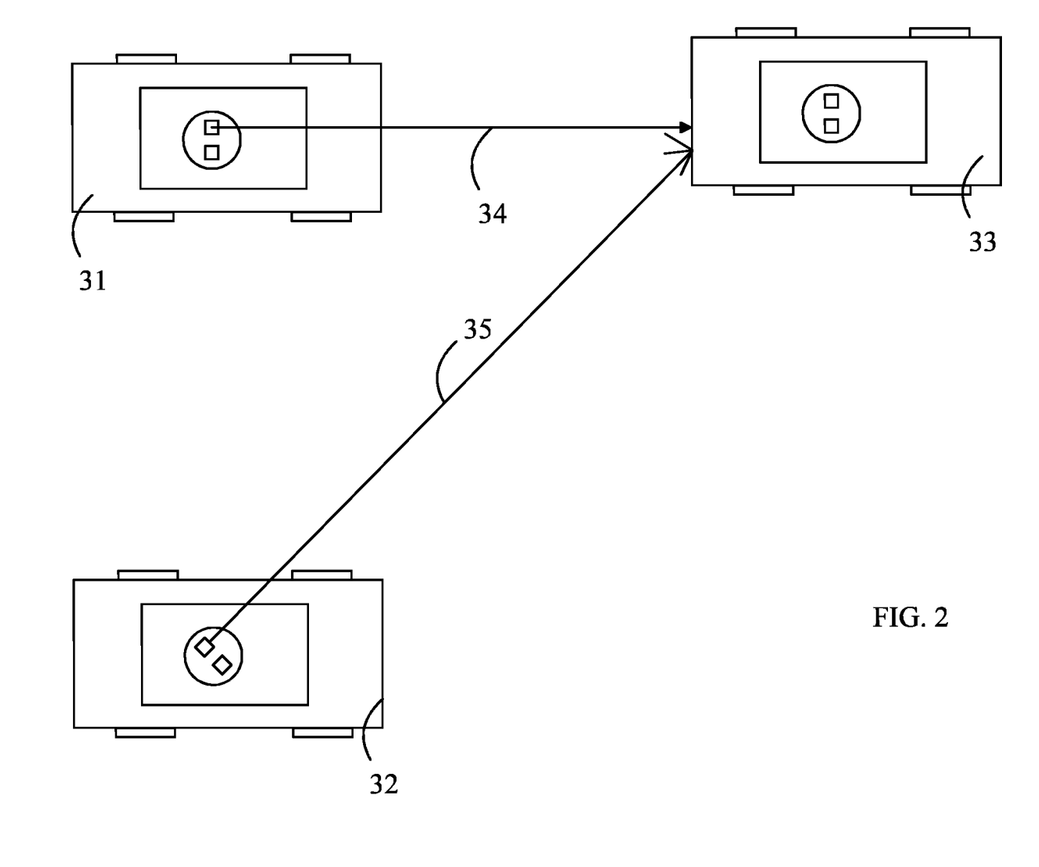
FIG. 2 illustrates the generation of noise pulses when multiple LIDAR systems are operating according to one embodiment.

The scattered light from the LIDAR system can appear to be a return signal to another LIDAR system, thereby creating noise pulses. Refer now to FIG. 2, which illustrates the generation of noise pulses when multiple LIDAR systems are operating. The LIDAR system in automobile 31 is attempting to detect automobile 33 and determine the range to automobile 33 by emitting light pulses along line 34 and looking for return pulses from that direction. A second automobile 32 is looking for objects along line 35. The outgoing light pulses from automobile 32 also strike automobile 33 and are scattered off of automobile 33. Part of the scattered light returns to automobile 31 and is detected by the receiver in automobile 31. Hence, automobile 31 must be able to distinguish between the received pulses to correctly range automobile 33.

One method for distinguishing the received pulses that were generated by outgoing pulses from a particular transmitter is to use the results of a number of "frames" to distinguish the desired return pulses from "noise" generated by other LIDAR transmitters in the area of operation. In general, the LIDAR system is designed to detect objects within some predetermined range. This range is typically set by determining the furthest object that is to be detected. A frame is defined to be the period of time between an outgoing pulse being launched and the time at which a reflection from the furthest object in question would be received.

In this system, the time of arrival of each pulse in a frame is noted. At the beginning of the ranging for a particular direction of inquiry by the LIDAR system, a memory array is zeroed. The memory array is indexed by the time of arrival of the pulse relative to the time at which the outgoing pulse was sent. For each received pulse after the start of a frame, an index is computed based on the time of flight of the pulse and the value stored in the memory array at that index is incremented. The process is repeated for a large number of frames with the LIDAR transmitter pointed in the same direction.

If there is no correlation between the timing of the noise pulses and the start of each frame, the noise pulses will be evenly distributed over the memory array. In contrast, the reflections of interest will be correlated with the start of the frame in which those pulses were received, and hence, the desired pulses will give rise to a peak in the contents of the memory array surrounded by a low background of noise peaks.

Unfortunately, the noise pulses can be correlated with the start of the frame. The frame rate is set to coincide with the longest distance that needs to be monitored for objects. Hence, vehicles using a LIDAR system tend to have the same frame length. Furthermore, to maximize the frame rate, the delay between frames is set as close to zero as practical. As a result, the repeated pulses from automobile 32 shown in FIG. 3 can be correlated with the start of the frame from the transmitter in automobile 31, since the systems have the same frame length, and hence, will only differ by the difference in the starting time for the frames, which is a constant offset, and hence, will not remove the correlation.

The present disclosure is based on the observation that introducing a variable delay that changes with each frame between frames can remove the correlations between the two transmitters provided both transmitters do not use the same delay scheme. Referring again to FIG. 2, consider a case in which the LIDAR system of automobile 32 is transmitting frames continuously without any delay between the frames, and the transmitter of the LIDAR of automobile 31 has random delays inserted between successive frames, but the frames are the same length in both systems. Also, assume that the LIDAR system of automobile 32 is pointing at automobile 33 and creating a reflection that is received by the LIDAR system of automobile 32 at a fixed interval after the LIDAR system of automobile 32 transmits the pulse that starts the frame for the LIDAR system of automobile 32.

Figure 3A:
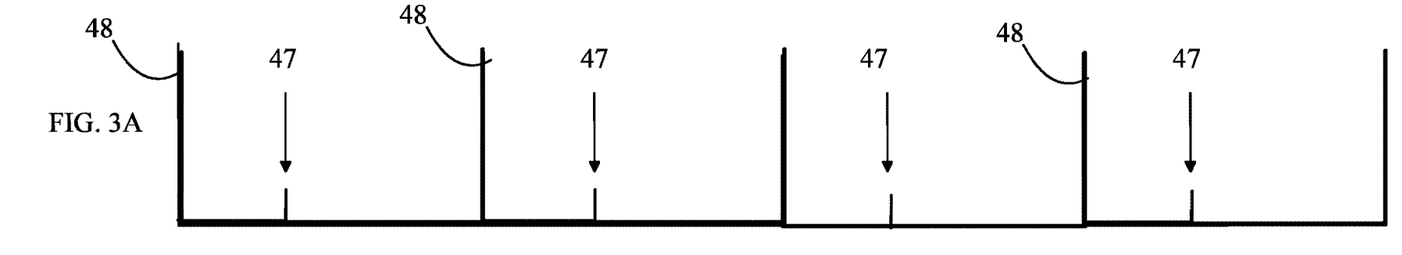
FIGS. 3A and 3B illustrate the frames and the signals received by the receiver in automobile 31 according to one embodiment.
Figure 3B:
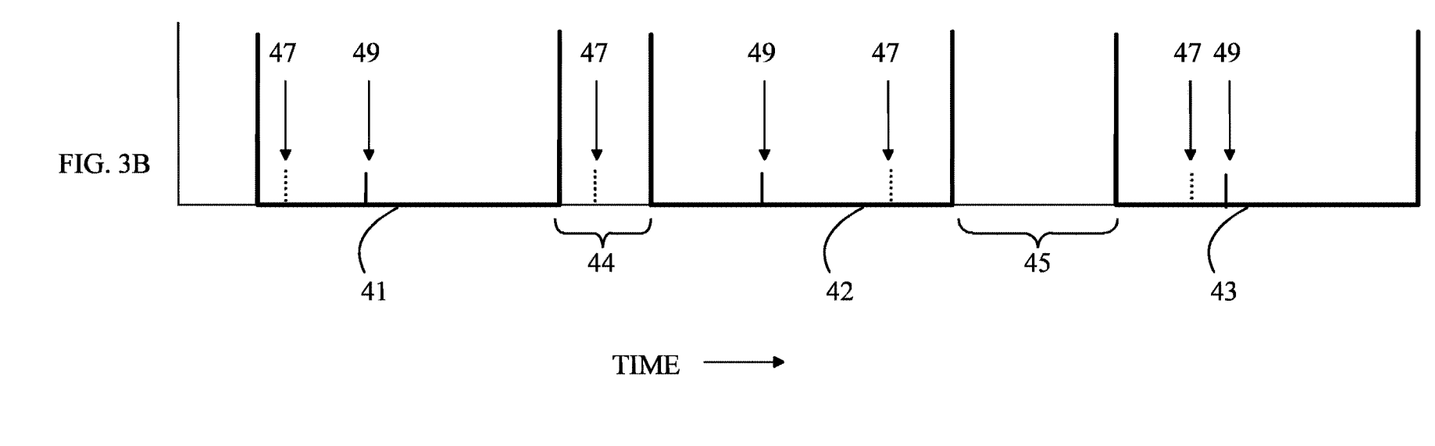

Refer now to FIGS. 3A and 3B which illustrate the frames and the signals received by the receiver in automobile 31. FIG. 3A illustrates the frames 48 generated by automobile 32 and a signal 47 created by a reflection off of automobile 33 which is seen by both automobile 31 and automobile 32. FIG. 3B illustrates the signals received by automobile 31 and the frames generated by automobile 31. The automobile 31 frames shown at 41-43 are the same length as those generated by automobile 32; however, a random delay has been inserted between the frames generated by automobile 31 as shown at 44 and 45. FIG. 3B also shows the signals received by automobile 31 in relation to the frames generated by automobile 31. While the pulses 49 appear at the same time in each frame relative to the start of the frame in FIG. 3B, the pulses generated by automobile 32 appear at different times relative to the start of each automobile 31 frame. Hence, when the results of a large number of automobile 31 frames are added together, the pulses resulting from the reflection of the pulses from automobile 31 will constructively add while the pulses generated by the transmitter in automobile 32 will form a low-level background. Thus the desired pulses can be distinguished from "noise".

Figure 4:
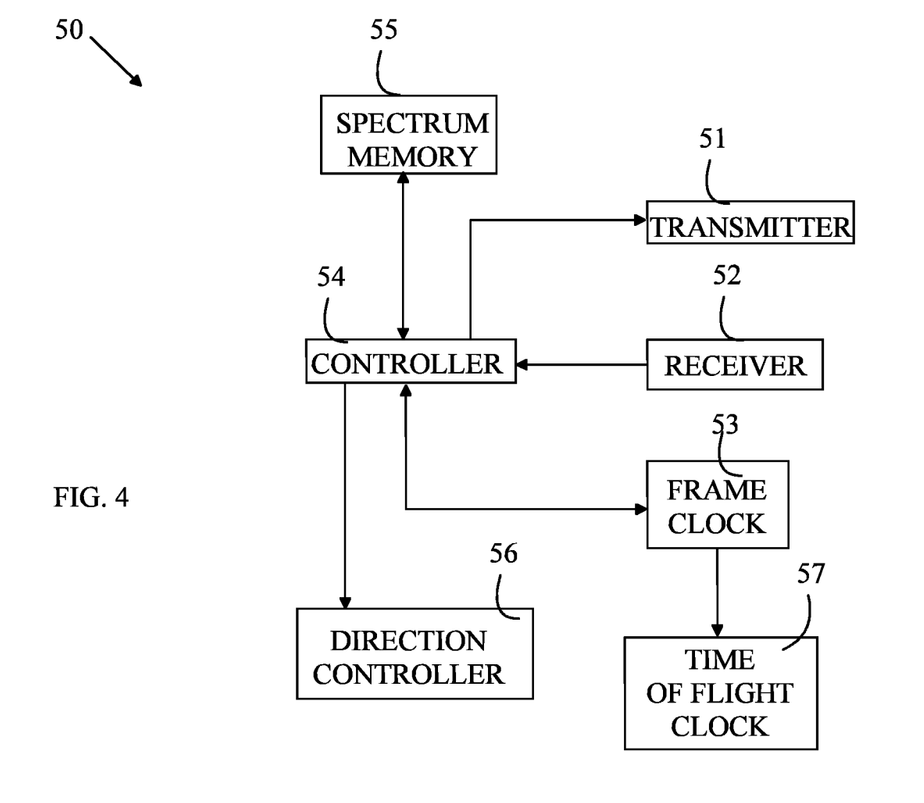
FIG. 4 illustrates one embodiment of a LIDAR system according to the present disclosure.

Refer now to FIG. 4, which illustrates one embodiment of a LIDAR system according to the present disclosure.

LIDAR system 50 includes a transmitter 51 and a receiver 52. In response to a signal from controller 54, transmitter 51 emits a short collimated light pulse in a direction set by direction controller 56. Transmitter 51 utilizes a laser to generate a pulse at a predetermined wavelength. The wavelength may be in the visible or infrared. The duration of the light pulse is preferably less than 1 ns in one exemplary embodiment. In another exemplary embodiment, the duration of the light pulse is less than 0.1 ns. When the transmitter emits a light pulse, frame clock 53 is also reset, and begins counting.

Receiver 52 detects light pulses that are consistent with a light pulse that would result from the scattering or reflection of a pulse from transmitter 51. In one aspect of the LIDAR system, receiver 52 includes a light detector, which is typically a photodiode or photo-transistor. However, any light detector whose response time is sufficient to detect differences in time of arrival corresponding to the accuracy of a ranging application can be utilized. In one preferred embodiment, the light detector can detect differences in the time of arrival of less than 1 ns. In another preferred embodiment, the light detector can detect differences in the time of arrival of less than 0.1 ns.

In another aspect of the LIDAR system, receiver 52 also includes a wavelength filter to block light outside a narrow band of wavelengths around the above-mentioned predetermined wavelength. Receiver 52 can also include a directional filter that blocks light pulses arriving from a direction that is outside a cone of angles about the direction that transmitter 51 launches the light pulses. In addition, in some embodiments, receiver 52 includes a "filter" that blocks pulses from the light detector that are inconsistent with a return signal from a pulse generated by transmitter 51.

In one aspect of the LIDAR system, the system also includes a memory that stores the number of return signals as a function of time after transmitter 51 launched a light pulse. The spectrum memory 55 will be referred to as the spectrum memory in the following discussion. At the start of a series of pulses that are to determine the positions of objects in the direction of the pulses from transmitter 51, controller 54 clears spectrum memory 55 by storing zeroes in each memory location. In one embodiment, the number of memory locations in spectrum memory 55 is the same as the maximum count for frame clock 53, and the memory locations are indexed by the contents of frame clock 53. When a suitable pulse is received by receiver 52, controller 54 increments the count in the spectrum memory at the location specified by the contents of the frame clock.

Figure 5:
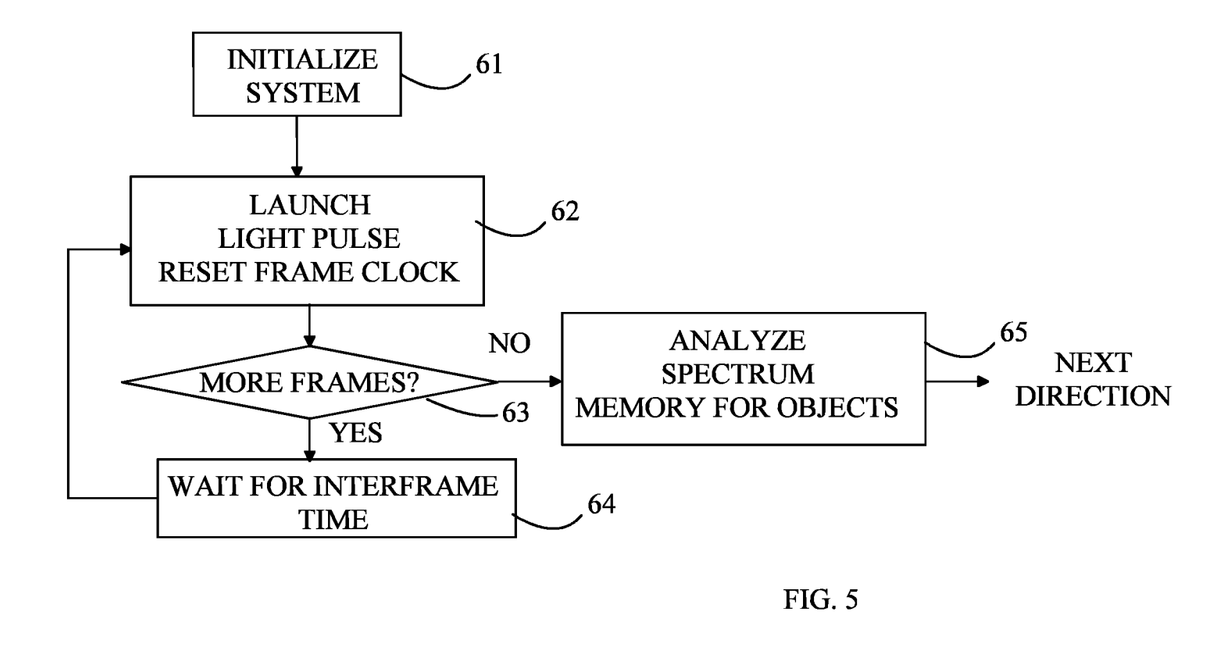
FIG. 5 is a flow chart of the operation of one embodiment of a method of the present disclosure for identifying objects in the current direction in which the transmitter and receiver are pointing.

Refer now to FIG. 5, which is a flow chart of the operation of one embodiment of a method of the present disclosure for identifying objects in the current direction in which the transmitter and receiver are pointing. The method starts by initializing the various components as shown at 61. During the initialization phase, all of the locations in the spectrum memory 55 are reset to zero, and a counter that is a part of controller 54 and keeps track of the number of completed frames is reset. Next, a light pulse is launched from transmitter 51 as shown at 62. At the same time, frame clock 53 is reset. Frame clock 53 increments on each pulse of a time-of-flight clock 57 until frame clock 53 reaches a predetermined maximum count that is determined by the maximum range of the LIDAR system and the frequency of time-of-flight clock 57 which determines the digitization error of the distance measurement.

A frame is completed when the frame clock has reached a predetermined maximum count. At this point controller 54 increments a frame counter and compares the number of frames recorded in that counter with a maximum frame count as shown at 63. If more frames are needed to reach the desired number of frames, the controller selects an interframe delay and waits for that delay time as shown at 64. At the end of the interframe delay, controller 54 causes the transmitter to launch a light pulse, and the frame clock is reset, thereby initiating the next frame.

Once the desired number of frames has been completed, the time-of-flight spectrum stored in spectrum memory 55 is analyzed to determine if one or more objects are within range and the distances to those objects as shown at 65. As noted above, the interframe delays are chosen to randomize returning light pulses that result from other LIDAR systems operating in the vicinity. Hence, the reflection from the object in the direction of the transmitter should be much higher than these noise reflections. Furthermore, the reflection that has the shortest time of flight and has sufficient amplitude, should provide the distance to the nearest object in the direction in question. It should be noted that other longer time-of-flight peaks in spectrum memory 55 can be the result of multiple reflections of the light pulse generated by the transmitter pulse.

The frame clock frequency determines the digitization error in the range measurements. The speed of light is approximately 1 nanosecond/foot. Since the LIDAR system is based on a reflection, a 1 ns period for frame clock 53 introduces a digitization error of approximately 6 inches in the distance measurement from a single pulse time of flight. The final range measurement is the average of a large number of such single measurements, and hence, can be significantly better than 6 inches. In one aspect of the LIDAR system, the frame clock frequency is greater than 1 GHz. However, embodiments in which the clock frequency is less than or equal to 1 GHz can also be useful.

The number of locations in the spectrum memory is determined by the maximum distance that needs to be measured between the LIDAR system and other objects in the vicinity of the LIDAR system and the frequency of the frame clock. For example, if the maximum distance is 200 feet, and the frame clock has a frequency of 1 GHz, the spectrum memory would need approximately 400 locations.

The above-described embodiments depend on an interframe delay that removes correlations between reflections caused by the transmitters in other LIDAR systems in the vicinity and the start of the frames of the current LIDAR system. In one aspect of the LIDAR system, the interframe delay is generated using a pseudo-random number generator to pick a delay between zero and one frame. A delay of less than one frame is not preferred because the delay will not distribute the noise pulses over the entire frame. Consider the case of a maximum delay that is one-tenth of a frame. A single strong noise pulse that occupied a single time slot in the spectrum will be spread over one-tenth of the memory slots surrounding the original noise time slot. The intensity of that noise peak in the spectrum will be reduced by a factor of 10. If such a reduction is sufficient to prevent the noise pulse from being assigned to an object, then the smaller delay can be utilized. A one frame maximum delay avoids this issue, and hence, is preferred; however, embodiments that utilize a smaller maximum frame delay still provide some noise reduction.

A delay that is longer than one frame does not provide significantly greater dispersion of the noise pulses; however, such a delay increases the time to obtain a range measurement in the current direction. At a maximum delay of one frame, the time to complete a range measurement will be increased by 50 percent. If the maximum delay were two frames, the time to complete the range measurement would be 100 percent greater. Hence, longer maximum delays decrease the efficiency of the ranging operation.

As noted above, a pseudo-random number generator can provide the interframe delay provided none of the vehicles in the vicinity are executing the same random sequence at the same time. Consider a single pseudo-random number generator. Typically, these generators start with a "seed". At each call, the generator produces a new seed and a number between two limits. The next call uses the new seed. In one aspect, the current seed is stored in a non-volatile memory in the controller. Each time the LIDAR system generates a frame, the stored seed changes. Suppose two vehicles started with the same seed at manufacture. Initially the two LIDAR systems would use the same sequence if they were turned on at exactly the same time. However, as time progresses, the LIDAR systems will be turned off and on for different numbers of times, and hence, the stored seeds will change. Hence, the two LIDAR systems will evolve such that the random sequence used by one is different from that used by the other.

In another aspect, the LIDAR systems are manufactured with different seeds. For example, the vehicle identification number could be used to generate a unique seed for each vehicle. In this case, the probability that two LIDAR systems would use the same random sequence is further reduced.

In the above-described embodiments, the interframe delays are randomly chosen between two limits. For the purposes of the present application, a delay will be defined to be random if the probability of that delay having any given value between the two limits in question is substantially equal.

In the above-described embodiments, the controller generates a fixed number of frames for each direction in which objects are sought. After the frames have been completed, the spectrum memory is examined to determine if there is a peak that is substantially above the background. In one aspect of the LIDAR system, the controller generates a further group of frames without resetting the spectrum memory if there is not such a clear peak.

In the above-described embodiments, the controller constructs a frequency distribution of the times of arrival as a function of the times of arrival. This frequency distribution is constructed on the fly. However other embodiments in which the controller stores information specifying the arrival time of each light pulse within the frame can be constructed as long as the information is sufficient to allow the controller to generate the frequency distribution question. For example, the controller could merely store the arrival times of each of the light pulses relative to the start of a frame by zeroing a register at the start of the frame and incrementing the register at some predetermined clock rate. Each time a pulse is detected, the contents of the register are recorded in a memory such as a push-down stack. At the end of the sequence of frames, the register values are used to compute the frequency distribution.

The above-described embodiments have been provided to illustrate various aspects of the LIDAR system. However, it is to be understood that different aspects that are shown in different specific embodiments can be combined to provide other embodiments of the LIDAR system. In addition, various modifications to the LIDAR system will become apparent from the foregoing description and accompanying drawings. Accordingly, the LIDAR system is to be limited solely by the scope of the following claims.

What is claimed is:

1. A LIDAR system comprising:
a transmitter that that emits a light pulse in response to a launch signal;
a receiver that detects light pulses and determines a time of arrival for each detected light pulse; and
a controller that generates an ordered sequence of frames, each frame being characterized by a start time, a stop time, and an interframe delay time, said controller generating said launch signal at said start time of each of said frames, recording information specifying a time of arrival relative to said start time for all light pulses received by said receiver until said stop time, and waiting for said interframe delay time before generating another launch signal, said interframe delay times being different for each frame in said sequence of frames, said controller determining a distance between said transmitter and an object that reflects said light pulses back to said receiver from a frequency spectrum of said time of arrivals generated from said recorded information for said sequence of frames.

2. The LIDAR system of claim 1 further comprising a spectrum memory having one memory location corresponding to each determined time of arrival within a predetermined range of times of arrival, said controller incrementing a value stored at one of said memory location in said spectrum memory determined by one of said determined times of arrival.

3. The LIDAR system of claim 1 wherein said transmitter emits said light pulses in an emission direction and said receiver includes a spatial filter that eliminates light pulses outside of a predetermined range of angles relative to said emission direction.

4. The LIDAR system of claim 1 wherein said stop time for each frame is displaced from said start time for that frame by a fixed frame length.

5. The LIDAR system of claim 4 wherein said interframe delay times have a duration between zero and said fixed frame length.

6. The LIDAR system of claim 4 wherein said interframe delay times have a length that is randomly chosen between zero and said fixed frame length, said fixed length being equal to the round-trip time for a light pulse to be reflected from an object at a predetermined maximum distance for which said LIDAR system is designed.

7. The LIDAR system of claim 2 wherein said receiver quantizes said times of arrival to integer values, each integer value corresponding to one of said memory locations in said spectrum memory.

8. The LIDAR system of claim 6 wherein said interframe delay times are generated by a pseudo-random number generator characterized by an initial seed that determines a sequence of values generated by said pseudo-random number generator.

9. The LIDAR system of claim 8 wherein said initial seed is different for each LIDAR system between zero and said fixed length.

10. A method for operating a LIDAR system, said method comprising:
causing said LIDAR system to generate a sequence of frames, each frame comprising a frame start, a frame stop, and an interframe delay that is different for each frame in said sequence of frames;
for each of said frames,
generating a light pulse at said frame start;
detecting light pulses arriving at said LIDAR system between said frame start and said frame stop, each of said detected light pulses being characterized by an arrival time at said LIDAR system relative to said frame start and storing information specifying said arrival times;
waiting for said interframe delay after said frame stop before proceeding to a next frame; and
determining a distance between said LIDAR system and an object that reflects said light pulses back to said LIDAR system from a frequency spectrum of said time of arrivals generated from said information specifying said arrival times for said sequence of frames.

11. The method of claim 10 wherein only light pulses arriving from a predetermined range of directions are detected.

12. The method of claim 11 wherein generating a light pulse comprises directing that light pulse in a first direction and said predetermined range of directions depends on said first direction.

13. The method of claim 10 wherein determining said distance comprises computing a frequency distribution of said arrival times as a function of said arrival time.

14. The method of claim 10 wherein said stop time for each frame is displaced from said start time for that frame by a fixed frame length that is the same for all frames.

15. The method of claim 10 wherein said interframe delays have a length that is randomly distributed between zero and said fixed frame length, said fixed frame length being equal to the round-trip time for a light pulse to be reflected from an object at a predetermined maximum distance for which said LIDAR system is designed.

16. The method of claim 15 wherein said interframe delays depend on said LIDAR system, different LIDAR systems having different sequences of interframe delays.

17. The method of claim 15 wherein said frames are characterized by a frame length equal to said stop time minus said start time, and wherein said randomly distributed interframe delays are characterized by a maximum delay that is greater than or equal to said frame length.

\* \* \* \* \*